United States Patent [19]

Kaufman et al.

[11] 4,243,767

[45] Jan. 6, 1981

[54] AMBIENT TEMPERATURE CURABLE HYDROXYL CONTAINING POLYMER/SILICON COMPOSITIONS

[75] Inventors: Lawrence G. Kaufman, North Bergen; Charles N. Merriam, Martinsville, both of N.J.

[73] Assignee: Union Carbide Corporation, New York, N.Y.

[21] Appl. No.: 961,473

[22] Filed: Nov. 16, 1978

[51] Int. Cl.³ .......................... C08F 8/32; C08F 8/42; C08C 19/00
[52] U.S. Cl. ..................... 525/102; 525/342; 525/403; 525/523; 528/87
[58] Field of Search ................. 526/29; 525/102, 342; 528/87, 404

[56] References Cited

U.S. PATENT DOCUMENTS

| | | | |
|---|---|---|---|
| 3,247,281 | 4/1966 | Gagliardi | 260/825 |
| 3,252,278 | 5/1966 | Marzocchi et al. | 57/153 |
| 3,252,825 | 5/1966 | Marzocchi et al. | 117/126 |
| 3,366,612 | 1/1968 | Baldwin et al. | 525/342 |
| 3,408,420 | 10/1968 | Wiggill | 260/827 |
| 3,907,974 | 9/1975 | Smith | 428/346 |
| 3,981,851 | 9/1976 | Plueddemann | 526/267 |
| 4,098,840 | 7/1978 | Yoshida et al. | 526/29 |

FOREIGN PATENT DOCUMENTS 2343079 9/1977 France .

Primary Examiner—William F. Hamrock
Attorney, Agent, or Firm—Reynold J. Finnegan; Bernard Francis Crowe

[57] ABSTRACT

Ambient temperature curable compositions comprising a hydroxyl containing organic polymer and an aminosilicon compound, said compositions being useful as protective coating compositions.

41 Claims, No Drawings

AMBIENT TEMPERATURE CURABLE HYDROXYL CONTAINING POLYMER/SILICON COMPOSITIONS

BACKGROUND OF THE INVENTION

This invention relates to novel room temperature curable compositions comprising a hydroxyl containing organic thermoplastic polymer and an aminosilicon compound, as well as to the crosslinked products derived from said compositions.

The employment of organosilanes to aid in the crosslinking of polymeric materials is well known in the art. However, heretofore in order to obtain room temperature curable compositions the prior art has had to prereact the starting organic polymer with the organosilane at elevated temperatures. One exception to such methods has been the use of halosilanes which are known to react at room temperature with hydroxyl containing polymers, however, this procedure has the disadvantage of also producing an undesirable acid by-product, e.g. hydrogen chloride, which if not removed may have a deleterious effect on the performance of the cured composition.

SUMMARY OF THE INVENTION

It has now been discovered that room temperature curable polymer compositions can also be easily prepared at room temperature by simply mixing a hydroxyl containing organic thermoplastic polymer with certain hydrolyzable aminosilicon compounds without also resulting in undesirable by-products.

Thus, it is an object of this invention to provide room temperature curable compositions comprising a hydroxyl containing organic thermoplastic polymer and a hydrolyzable aminosilicon compound. It is another object of this invention to provide cured crosslinked products, e.g. solvent resistant coatings, derived from the curable compositions of this invention. Other objects and advantages of this invention will become readily apparent from the following description and appended claims.

More specifically one aspect of this invention may be described as a substantially anhydrous, acid-free, room temperature curable composition which comprises (A) an organic thermoplastic polymer containing at least two hydroxyl radicals which are directly bonded to noncarboxylic carbon atoms of said polymer; and (B) a hydrolyzable aminosilicon compound selected from the class consisting of aminosilicon compounds having the formula

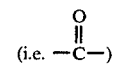

and mixtures thereof wherein:

X is an alkoxy radical having 1 to 6 carbon atoms; R is a divalent alkylene radical having 1 to 4 carbon atoms; $R^1$ is hydrogen or an alkyl radical having 1 to 4 carbon atoms; $R^2$ is a radical selected from the group consisting of hydrogen, an alkyl radical having 1 to 4 carbon atoms and a silyl radical of the formula

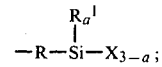

wherein R, $R^1$, and X are the same as defined above; $R^3$ is a divalent alkylene radical having 2 to 4 carbon atoms; a has a value of 0 to 2; t has a value of 0 to 4; and wherein said composition contains about 5 to 50 parts by weight of said hydrolyzable aminosilicon compound (B) per 100 parts by weight of said organic polymer (A).

DESCRIPTION OF THE PREFERRED EMBODIMENTS

Any hydroxyl containing organic thermoplastic polymer having at least two hydroxyl radicals which are directly bonded to non-carboxylic

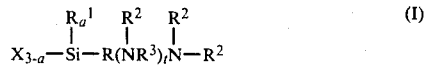

carbon atoms can be employed as the organic polymer component of the room temperature (i.e. ambient) curable compositions of this invention. Such types of hydroxyl containing organic polymers and/or methods for their preparation are well known in the polymer art. Of course it is to be understood that the hydroxyl containing organic thermoplastic polymers employable in this invention include homopolymers, copolymers, terpolymers and the like and that mixtures of more than one type or class of polymers can be employed if desired. Likewise, it is to be understood that the particular proportions of polymer units and molecular weights of the hydroxy containing organic thermoplastic polymer components of this invention are not generally critical to the invention. Illustrative examples of such hydroxyl containing organic thermoplastic polymers include:

(a) Hydroxyalkyl acrylate modified vinyl chloride polymers such as the uniformly random hydroxyl-functional copolymers or terpolymers of (i) vinyl chloride; (ii) hydroxyalkyl acrylate having 2 to 4 carbons in the alkyl segment; and, optionally, (iii) a polymerizable monomer chosen from alkyl (1–8 carbon) esters of polymerizable alpha, beta-ethylenically unsaturated acids such as acrylic, methacrylic, maleic, fumaric, itaconic and the like, and vinyl esters of saturated fatty acids of 1–6 carbon atoms, such as vinyl acetate, vinyl propionate and the like. Suitable hydroxyl-functional copolymers and terpolymers are described in U.S. Pat. No. 3,884,887 and U.S. Pat. No. 3,755,271.

(b) Polyether polyol polymers such as the alkylene oxide adducts of water or a polyhydric organic compound as the initiator or starter, e.g. illustrative initiators which may be used individually or in combination include ethylene glycol; diethylene glycol; propylene glycol; 1,5-pentanediol; hexylene glycol; dipropylene glycol; trimethylene glycol; 1,2-cyclohexanediol; 3-cyclohexane-1,1-dimethanol and dibromo-derivative thereof; glycerol; 1,2,6-hexanetriol; 1,1,1-trimethyolethane; 1,1,1-trimethyolpropane; 3-(2-hydroxyethoxy)- and 3-(2-hydroxypropoxy)-1,3-propanediols; 2,4-dimethyl-2-(2-hydroxyethoxy)methylpentanediol-1,5; 1,1,1-tris[2-hydroxyethoxy)methyl]ethane; 1,1,1-tris[2-hydroxypropoxy)methyl]propane; pentaerythritol; sorbitol; sucrose; alphamethyl glucoside; and other such polyhydric compounds consisting of carbon, hydrogen and oxygen and having usually not more than about 15 carbon atoms per molecule. Illustrative alkylene oxides include ethylene oxide, propylene oxide, butylene oxide as well as various mixtures of such oxides. Also included among the polyether polyol polymers useful herein are poly(hydroxyethers) derived from diphenols and epichlorohydrin, e.g. phenoxy resins, as well as those polymers commonly referred to in the art as polymer/polyether polyols which may be produced by polymerizing one or more ethylenically unsaturated monomers dissolved or dispersed in any of the above described alkylene oxide adduct polyols. Illustrative of such unsaturated monomers which may be employed individually or in combination include ethylene, propylene, acrylonitrile, methacrylonitrile, vinyl chloride, vinylidene chloride, styrene, alpha-methylstyrene, butadiene, and the like.

(c) Polyhydroxy containing acrylic polymers such as the copolymers and terpolymers of hydroxyalkyl acrylates having 2 to 4 carbon atoms in the alkyl segments and alkyl acrylates and/or alkyl methacrylates having 1 to 6 carbon atoms in the alkyl segments.

(d) Polyvinyl alcohol polymers such as the hydrolyzed or partially hydrolyzed polymers derived from the homopolymers of vinyl esters of saturated fatty acids of 1-6 carbon atoms or the copolymers of said vinyl esters and one or more ethylenically unsaturated monomers such as ethylene, propylene, butylene, acrylonitrile, methacrylonitrile, vinyl chloride, vinylidene chloride, styrene, alpha-methylstyrene, butadiene, and the like.

(e) Polyhydroxy containing polyvinyl acetal polymers such as polyvinylbutyral resins and the like.

(f) Polyester polyol polymers such as the reaction products of polyfunctional organic carboxylic acids and polyhydric alcohols, which reaction products contain at least two hydroxyl groups (as alcoholic OH) per molecule, and cyclic ester polymers containing at least two hydroxyl groups per molecule prepared from epsilon caprolactone or other lactones and the copolymers of such lactones with polyhydric alcohols.

Typical of the polyfunctional organic carboxylic acids that can be employed in producing polyester polyols useful in this invention are: dicarboxylic aliphatic acids such as succinic, adipic, sebacic, azelaic, glutaric, pimelic, malonic and suberic acids; and dicarboxylic aromatic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyester polyols.

The polyhydric alcohols (organic polyols) that can be employed in producing the polyester polyol starting material useful in this invention include the monomeric polyhydric alcohols such as, for example, glycerol; 1,2,6-hexanetriol; ethylene glycol; diethylene glycol; trimethylol propane; trimethyolethane; pentaerythritol; propylene glycol; 1,2-, 1,3- and 1,4-butylene glycols; 1,5-pentanediol; sorbitol; and the like, including mixtures thereof.

Other polyhydric alcohols that can be employed in producing the polyester polyols useful in this invention are the polymeric polyhydric alcohols which include the linear and branched chain polyethers having a plurality of acyclic ether oxygens and at least two alcoholic hydroxyl radicals. Illustrative of such polyether polyols are the poly(oxyalkylene) polyols containing one or more chains of connected oxyalkylene radicals which are prepared by the reaction of one or more alkylene oxides with acyclic and alicyclic polyols. Examples of the poly(oxyalkylene) polyols include the poly(oxyethylene) glycols prepared by the addition of ethylene oxide to water, ethylene glycol or diethylene glycol; poly(oxypropylene) glycols prepared by the addition of propylene oxide to water, propylene glycol or dipropylene glycol; mixed oxyethylene-oxypropylene polyglycols prepared in a similar manner utilizing a mixture of ethylene oxide or a sequential addition of ethylene oxide and propylene oxide; and the poly(oxybutylene) glycols and copolymers such as poly(oxyethylene-oxybutylene) glycols and poly(oxypropylene-oxybutylene) glycols. Included in the term "poly(oxybutylene) glycols" are polymers of 1,2-butyleneoxide and 2,3-butyleneoxide.

Illustrative of further polyester polyols are the reaction products of any of the aforesaid polycarboxylic acids and the polyhydric alcohols prepared by the reaction of one or more alkylene oxides such as ethylene oxide, propylene oxide, butylene oxide and mixtures thereof, with any of the following: glycerol; trimethylolpropane, 1,2,6-hexanetriol; pentaerythritol; sorbitol; glycosides such as methyl, ethyl, propyl, butyl and 2-ethylhexyl arabinoside, xyloside, fructoside, glucoside, and rhammoside; sucrose; mononuclear polyhydroxybenzenes such as resorcinol, pyrogallol, phloroglucinol, hydroquinone, 4,6-di-tertiarybutylcatechol, and catechol; polynuclear hydroxybenzenes ("polynuclear" designating at least two benzene nuclei) such as the di-, tri- and tetraphenylol compounds in which two to four hydroxybenzene groups are attached either directly by means of single bonds or through an aliphatic hydrocarbon radical containing one to twelve carbon atoms, such compounds being typically illustrated by 2,2-bis(p-hydroxyphenyl)-propane, bis(p-hydroxyphenyl)-methane and the various diphenols and diphenol methanes disclosed in U.S. Pat. Nos. 2,506,486 and 2,744,882, respectively. Another type of polyester polyol is that produced by reaction of a polycarboxylic acid and the polyether adducts formed by reaction of ethylene oxide, propylene oxide or butylene oxide with phenol-formaldehyde condensation products such as the novolaks.

(g) Phenolic resin polymers such as the solid resoles and novolak resins disclosed in copending U.S. Application Ser. No. 765,300 filed Feb. 3, 1977, U.S. Pat. No. 4,116,921 and British Pat. No. 1,417,437. The phenol of the resin can be unsubstituted phenol or substituted such as cresol, bisphenol-A, para-substituted phenols and the like while formaldehyde or a material that generates formaldehyde in situ is the aldehyde employed in making phenol resins. The preferred phenolic resins are resoles produced by reacting formaldehyde with bisphenol-A at elevated temperatures in the presence of a base-catalyst and having a neutralized pH of about 3 to 8.

The preferred hydroxyl containing organic thermoplastic polymer components of this invention are the hydroxylalkyl acrylate modified vinyl chloride polymers described above having (a) from about 50 to 85 weight percent vinyl chloride derived per units; (b) from 0 to 10 weight percent mer units derived from a polymerizable monomer selected from the class consisting of alkyl esters of alpha, beta-ethylenically unsaturated carboxylic acids as described above and vinyl esters of saturated fatty acids as described above, the preferred polymerizable monomer being vinyl acetate, and (c) from 10 to 30 weight percent mer units derived from hydroxyalkyl acrylate as described above, preferably hydroxypropyl acrylate. The most preferred polymer being a uniformly hydroxyl-functional random terpolymer of about 80 weight percent vinyl chloride mer units, about 5 weight percent vinyl acetate mer units and about 15 weight percent hydroxypropyl acrylate mer units.

With regard to the aminosilicon compounds and mixtures thereof of Formula I above it is to be understood that each X, R, $R^1$, $R^2$, $R^3$, a and t may be the same or different in any given aminosilicon compound and mixtures thereof. Moreover, illustrative radicals represented by X above include alkoxy radicals having 1 to 6 carbon atoms, such as methoxy, ethoxy, propoxy, 2-methoxyethoxy, isopropoxy, hexyloxy and the like, the preferred alkoxy radicals being methoxy, ethoxy and 2-methoxyethoxy. Illustrative divalent alkylene radicals represented by R above include methylene, ethylene, propylene, isopropylene, butylene and the like, the preferred divalent alkylene groups being ethylene ($—C_2H_4—$) and propylene ($—C_3H_6—$). Illustrative radicals represented by $R^1$ above include alkyl radicals such as methyl, ethyl, propyl, isopropyl, butyl and the like. Illustrative radicals represented by $R^2$ above include hydrogen, alkyl radicals such as methyl, ethyl, propyl, isopropyl, butyl and the like, as well as silyl groups of the formula

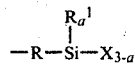

wherein R, $R^1$, X and a are the same as defined above. In those aminosilicon compounds of Formula (I) that contain only one silicon atom $R^2$ is preferbly hydrogen. Illustrative divalent alkylene groups represented by $R^3$ above include ethylene, propylene, isopropylene, butylene, and the like, the preferred divalent alkylene groups being ethylene and propylene. In the more preferred organosilicon compounds a is preferably 0 and t is preferably 1.

Illustrative aminosilicon compounds that may be employed in this invention include, for example

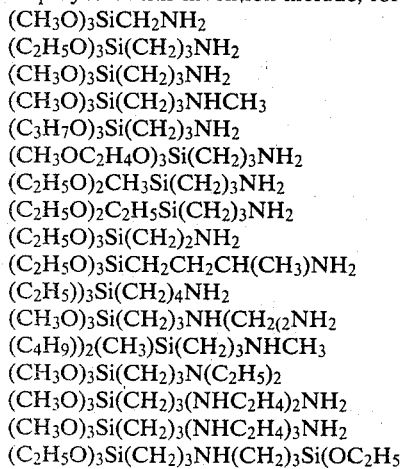

(CH₃O)₃SiCH₂NH₂
(C₂H₅O)₃Si(CH₂)₃NH₂
(CH₃O)₃Si(CH₂)₃NH₂
(CH₃O)₃Si(CH₂)₃NHCH₃
(C₃H₇O)₃Si(CH₂)₃NH₂
(CH₃OC₂H₄O)₃Si(CH₂)₃NH₂
(C₂H₅O)₂CH₃Si(CH₂)₃NH₂
(C₂H₅O)₂C₂H₅Si(CH₂)₃NH₂
(C₂H₅O)₃Si(CH₂)₂NH₂
(C₂H₅O)₃SiCH₂CH₂CH(CH₃)NH₂
(C₂H₅))₃Si(CH₂)₄NH₂
(CH₃O)₃Si(CH₂)₃NH(CH₂(₂NH₂
(C₄H₉))₂(CH₃)Si(CH₂)₃NHCH₃
(CH₃O)₃Si(CH₂)₃N(C₂H₅)₂
(CH₃O)₃Si(CH₂)₃(NHC₂H₄)₂NH₂
(CH₃O)₃Si(CH₂)₃(NHC₂H₄)₃NH₂
(C₂H₅O)₃Si(CH₂)₃NH(CH₂)₃Si(OC₂H₅)₃

(CH₃O)₃Si(CH₂)₃NH(CH₂)₂NH(CH₂)₃Si(OCH₃)₃
(C₂₂H₅O)₃Si(CH₂)₃N[(CH₂)₃Si(OC₂H₅)₃](CH₂)₃Si(OC₂H₅)₃
(CH₃O)₃Si(CH₂)₃[NH(CH₂)₂]₂NH(CH₂)₃Si (OCH₃)₃
(CH₃O)₃Si(CH₂)₃[NH(CH₂)₂]₃NH(CH₂)₃Si(OCH₃)₃
(CH₃O)₃Si(CH₂)₃NH(CH₂)₂N[(CH₂)₃Si(OCH₃)₃](CH₂)₃Si(OCH₃)₃
(CH₃O)₃Si(CH₂)₃N[(CH₂)₃Si(OCH₃)₃](CH₂)₂N[(CH₂)₃Si(OCH₃)₃](CH₂)₃Si(OCH₃)₃
(C₂H₅O)₃Si(CH₂)₃NH(CH₂)₂NH(CH₂)₃Si(OCH₃)₃
(CH₃OC₂H₄O)₃Si(CH₂)₃NH(CH₂)₂NH(CH₂)₃Si(OC₂H₄OCH₃)₃ and the like, as well as mixtures thereof.

The aminosilicon compounds and mixtures of Formula (I) above which can be used as the silicon component of the compositions of this invention are also well known in the art as are methods for their preparation. Thus, with regard to the aminosilicon compounds and mixtures thereof employable in this invention it is to be understood that while a single type of aminosilicon compound or mixtures of various combinations of different aminosilicon compounds can be used, it is not necessary to form said mixtures by combining individually isolated aminosilicon compounds, although such may be done if desired. For example, it is well known in the art that aminosilicon compounds such as the polyamino silanes and multiple silylated aminosilicon compounds of Formula (I) above are normally produced in the form of a mixture consisting essentially of different types of such aminosilicon compounds of Formula I above due to the manner in which they are generally prepared. For instance, in the conventional reactions employed to produce polyaminoalkylene silanes or multiple silylated polyaminoalkylene compounds, e.g. by the reaction of an alkylenediamine and a haloalkyl silane or by the reaction of an aminoalkyleneaminoalkylene silane and a haloalkyl silane, in addition to the desired product, the crude reaction product can be expected to consist of a mixture of symmetrical and unsymmetrical bis, tris and tetrakis silyl compounds, and the like, due to the multiple amino reaction sites on the amino starting material. Accordingly, included within the definition of the aminosilicon compounds that can be employed in the compositions of this invention are such crude aminosilicon compound reaction products that contain more than one amino group and/or silyl group as shown by Formula (I) above. Indeed, since the more preferred aminosilicon compounds employable in this invention are those containing more than one amino group and/or more than one silyl group it is generally preferred to employ the crude reaction product mixture obtained upon producing the type of aminosilicon compound that one wishes to use in the particular composition of this invention desired for a particular end result, since such eliminates the time and effort caused by additional procedural steps necessary in preparing and isolting any particular singular aminosilicon compound prior to its use herein.

Accordingly, the more preferred aminosilicon compounds employable in this invention are those of Formula (I) above wherein at least one $R^2$ group represents a silyl radical of the formula

and mixtures thereof, wherein R, $R^1$ and a are the same as defined above, e.g. $(CH_3O)_3Si(CH_2)_3NH(CH_2)_2NH(CH_2)_3Si(OCH_3)_3$.

Moreover, due to the fact that the present invention allows for the use of the crude reaction product mixtures of said preferred aminosilicon compounds produced by either above described conventional procedures thereby rendering it unnecessary to obtain a single species of the desired aminosilicon compound, the more preferred aminosilicon compound component of this invention is a crude aminosilicon reaction product mixture having an average empirical mole ratio of the following structural units

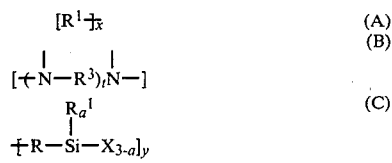

wherein R, $R^1$, $R^3$, a, and t are the same as defined above, with $R^1$ preferably being a hydrogen radical, t preferably having a value of 1 to 2 and a preferably being 0; while x has a value of 0 to 6 preferably 1 to 4, y has a value of 1 to 6, preferably 2 to 5; the sum of $x+y$ being a value of 3 to 6, preferably 4 to 5. Of course it is understood that said structural units (A) and (C) are both directly bonded to said structural unit (B) thereby satisfying all of the free valences of said structural units (A), (B) and (C).

The most preferred aminosilicon compound employable in the composition of this invention is a crude aminosilicon reaction product mixture having an average empirical mole ratio of the following structural units

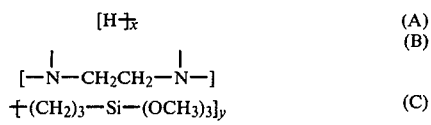

wherein x has a value of 0 to 3; y has a value of 1 to 4, preferably 2 to 4; the sum of $x+y$ being 4; said structural units (A) and (C) both being directly bonded to said structural unit (B) thereby satisfying all of the free valances of said structural units (A), (B) and (C).

The hydroxyl-containing organic polymer-aminosilicon compositions of this invention are uniformly blended solutions containing about 5 to about 50 parts by weight, and more preferably about 10 to about 40 parts by weight of the aminosilicon compound per 100 parts by weight of the organic polymer, and can be prepared by merely mechanically mixing said ingredients together along with other various conventional components that may be included if desired in the room temperature curable compositions. The particular design of mixing equipment and the method and order of the various components is not critical, although it is preferred to add the aminosilicon compound to a solution of the organic polymer and additional ingredients when employed. In addition since the compositions of this invention are reactive in the presence of water the mixing of the various components should be conducted under substantially anhydrous type conditions, such as closing the equipment so that the ambient atmosphere can be controlled. Moreover, since the compositions of this invention are mildly basic in nature, it is desirable to exclude or control their contact with any acidic or potentially acidic environmental components such as $SO_2$, $CO_2$, or HCl which may be in the atmosphere. It may also be desirable to dry or dehydrate any additional components which are added.

As indicated above the compositions of this invention may also contain additional components so long as they and/or their amounts would not destroy the basic concept of this invention such as alkyl silicates to increase the solids content of the cured composition without increasing the viscosity of the curable composition, fillers, pigments, dyestuffs, diluents, solvents, dispersing agents, dessicants such as molecular sieves, odorants, plasticizers, softeners, elastomeric modifiers, thermal stabilizers, antioxidants, and the like. The particular choice and amount of such additives when employed will of course merely depend on the ultimate end use desired for the compositions of this invention.

The hydroxyl-containing organic polymer-aminosilicon compositions of this invention have a wide variety of utility such as in the fields of coatings, laquers, paints, inks, dyes, tints, impregnations, adhesives, caulks, sealants and the like. Said compositions are especially useful as room temperature curable coating compositions which may be applied over a wide variety of substrates, such as metals, plastics, wood, cloth, foam, glass, and the like, as well as over primers, by any conventional method such as by spraying, brushing, dipping, flow coating, and the like. Said compositions are particularly useful in all fields of use where cured (crosslinked) protective and/or decorative solvent resistant coatings are desired, such as in the fields of maintenance and marine coatings.

For example, the compositions of this invention when kept anhydrous have been found to provide excellent protective and solvent resistant cured coatings for metals merely by air drying the curable coating compositions at room (ambient) temperature after it has been applied to the metal. Normally, the ambient moisture in the air is sufficient to cure (crosslink) the coating into a dry, hard corrosion and solvent resistant protective film on the metal. The curable composition generally becomes dry very quickly and cured coatings having excellent properties have been achieved within 24 hours after coating the substrate. Of course, it is to be understood that the curing may be accelerated, if desired, by the employment of elevated temperatures. In addition to the surprisingly excellent solvent resistance of the cured compositions of this invention such cured coatings have also been found to have good impact strength, weatherability and environmental resistance as exhibited by their good stability against salt sprays, and against chalking on exposure to sunlight, as well as their resistance to deterioration, corrosion and blistering upon being immersed in both fresh water and seawater for prolonged periods of time. Of course it is to be understood that the ultimate properties of any given room temperature curable coating composition will depend upon such obvious factors as the various ingredients employed, their concentrations, the crosslinked density of the final composition, and the like. However, the optimum results desired for any composition is well within the bounds of routine experimentation.

While not wishing to be bound by any particular theory of mechanism involved, it is believed that the aminosilicon compound reacts with the polymer via transesterification followed by hydrolysis of the silane portion. Experiments have indicated that the aminosilicon compound is bound to the hydroxyl containing polymer through an Si-O-C bound via transesterification which then upon exposure to the ambient moisture in the air hydrolyzes and cures (crosslinks) into a solid film.

The most preferred coating composition of this invention are those consisting essentially of a hydroxyalkyl acrylate modified vinyl chloride polymer as defined above and a hydrolyzable aminosilicon compound or mixtures thereof as defined above, said composition containing about 5 to 50 and more preferably about 10 to 40 parts by weight of said silicon compound per 100 parts by weight of said polymer. Said preferred composition may also and more often preferably contains the following additional additives such as an organic solvent in an amount sufficient to dissolve the polymer employed; about 70 to 100 parts by weight of a pigment per 100 parts by weight of said polymer; 0 to about 70 parts by weight of a filler material per 100 parts by weight of said polymer; 0 to about 25 parts by weight of an alkyl silicate per 100 parts by weight of said polymer; and based on the total weight of the composition, 0 to about 1 percent by weight of a dispersing agent for the pigment and 0 to about 3 percent by weight of a dessicant. The most preferred hydroxyalkyl acrylate modified vinyl chloride polymers and aminosilicon compounds useful in this invention have already been defined above. In general a typical coating composition will consist of about 10 to 35 percent by weight of said hydroxyalkyl acrylate modified vinyl chloride polymer based on the total weight of the composition. Of course, it is obvious that the particular additives employed are not critical and any suitable solvent, pigment, filler, alkyl silicate, dispersing agent and dessicant can be employed. In general, the preferred solvents are methylisobutyl ketone, xylene and mixtures thereof, while the preferred pigment is titanium dioxide and the preferred dessicant is molecular sieves.

The alkyl silicates are also well known in the art and include unhydrolyzed alkyl and alkoxyalkyl silicates and alkyl and alkoxyalkyl silicates hydrolyzed up to about 85 percent by weight. Alkyl silicates are produced by the reaction of silicon tetrachloride and alcohols and alkoxy alcohols, generally in a reactor equipped with a stirrer, condenser and vat scrubber. The hydrogen chloride by-product is removed by reflux which may be carried out at reduced or atmospheric pressure. Through this process, the most common products TEOS (tetraethyl orthosilicate), and Cellosolve (Trademark of the Union Carbide Corporation for monoalkyl ethers of ethylene glycol) silicate are made. Subsequently, these products may be partially hyrolyzed by the addition of water and an acid catalyst. The amount of water added determines the degree of hydrolysis in the final product. Commercially available products derived from ethanol include the unhydrolyzed TEOS, Condensed Ethyl Silicate (about 7 percent hydrolysis), Ethyl Silicate 40 (40 percent hydrolysis containing 40% $SiO_2$), and Ethyl Silicate P-18, having an 80 to 85 percent hydrolysis level.

The following examples illustrate the present invention and are not to be regarded as limitative. All parts and percentages are by weight unless otherwise specified.

For the sake of brevity in the Examples, the designations in the first column of Table I will be used in lieu of the complete description given in the second column.

TABLE I

| Designation | Composition |
|---|---|
| Polymer A | A uniformly random hydroxyl-functional terpolymer of 80% vinyl chloride mer units, 5% vinyl acetate mer units and 15% hydroxylpropyl acrylate mer units. Inherent viscosity is 0.3. |
| Polymer B | A partially hydrolyzed polyvinyl alcohol terpolymer of 91% vinyl chloride mer units, 3% vinyl acetate mer units and 6% vinyl alcohol mer units. Viscosity is 60 cps (20% resin in methyl ethyl ketone). Sold by Union Carbide Corporation under the product designation VAGH. |
| Polymer C | A thermoplastic polyhydroxyether phenoxy resin polymer having a specific gravity of 1.18 and sold by Union Carbide Corporation under the product designation PKHH. |
| Polymer D | A bisphenol A-formaldehyde phenolic resin containing approximately 16% methylol groups, sold by Union Carbide Corporation under the product designation BK-5918. |
| Polymer E | A polyhydroxyl containing acrylate polymer sold by Rohm & Haas under the product designation Acryloid AT-56. |
| Polymer F | A polyvinyl butyral resin polymer containing 1% vinyl acetate mer unite and 20% vinyl alcohol mer units having an Inherent viscosity of 0.90 and sold by Union Carbide Corporation under the product designation XYHL. |
| Nuosperse ® 657 | A dispersing agent supplied by Tenneco, Inc. |
| ES-40 | A partially hydrolyzed ethyl polysilicate containing 40 percent by weight of $SiO_2$. |
| TEOS | Unhydrolyzed tetraethyl orthosilicate. |
| Silane A | A commercial grade silane designated as N-beta-(Aminoethyl)-gamma-aminopropyl-trimethoxy-silane sold under the product name A-1120 by Union Carbide Corporation. |
| Silane B | A silane having the formula $(C_2H_5O)_3Si(CH_2)_3NH_2$ |
| Silane C | The crude aminosilane reaction product mixture of Example A of this application. |
| Silane D | A silane having the formula $(CH_3O)_3Si(CH_2)_3NH(CH_2)_2NH_2$ distilled from Silane A |
| Silane E | A silane having the formula $(CH_3O)_3Si(CH_2)_3NH_2$ |
| Silane F | A silane having the formula $(CH_3O)_3SiCH_2CH_2Si(OCH_3)_3$ |
| Silane G | The crude aminosilane reaction product mixture of Example B of this application. |
| Silane H | The crude aminosilane reaction product mixture of Example C of the application. |

EXAMPLE A

An aminosilicon compound was prepared by reacting 399.8 grams (1.8 moles) of an aminosilane having the formula $(CH_3O)_3Si(CH_2)_3NH(CH_2)_2NH_2$ (which was distilled from Silane A) with 357.7 grams (1.8 moles) of a silane having the formula $(CH_3O)_3Si(CH_2)_3Cl$ at 110° C. for an hour. The reaction product was then cooled to room temperature and treated with 108.2 grams (1.8 moles) of ethylene diamine to remove HCl from the reaction product which was then stripped to 175° C. under vacuum (0.5 mm Hg) to remove all lites up to the aminosilane starting material. About 650 grams of a crude aminosilicon reaction product mixture was obtained which had an Amine Equivalent of 1.72 grams-nitrogen and consisted essentially of a major amount of aminosilicon compounds having the following mole structural unit ratios:

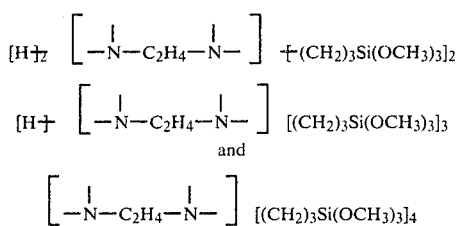

and a minor amount of unreacted
  $(CH_3O)_3Si(CH_2)_3NH(CH_2)_2NH_2$ starting material. As employed in this application the crude reaction product mixture of this Example is designated Silane C.

EXAMPLE B

An aminosilicon compound was prepared by reacting 2443 grams (11.0 moles) of Silane A (12.6% titratable nitrogen) with 1747 grams (8.8 moles) of a silane having the formula
  $(CH_3O)_3Si-(CH_2)_3Cl$
at 110°±10° C. for four hours. The reaction product was then cooled to room temperature and treated with 529 grams (8.8 moles) of ethylene diamine at 60° C. to remove HCl from the reaction product which was then stripped at 100° C./40 mm Hg. to remove the residual ethylene diamine. About 3576 grams of a crude aminosilicon reaction product mixture was obtained. Gas chromatographic analysis of the crude reaction product mixture showed it to consist essentially of about 30 percent by weight of an aminosilicon compound having the following mole ratio of structural units

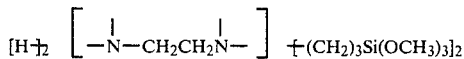

about 24 percent by weight of an aminosilicon compound having the following mole ratio of structural units

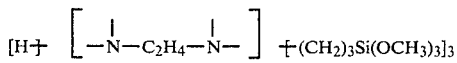

about 5 percent by weight of an aminosilicon compound having the following mole ratio of structural units

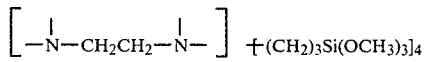

about 19 percent by weight
  $(CH_3O)_3Si(CH_2)_3NH(CH_2)_2NH_2$
and about 5 percent by weight of

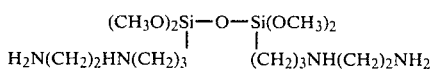

the remainder of the reaction product consisting essentially of mix non-eluting polysiloxane polymers. As employed in this application the crude reaction product mixture of this Example is designated Silane G.

EXAMPLE C

An aminosilicon compound was prepared by repeating Example II on a plant scale. 400 pounds of Silane A was reacted with 286 pounds of $(CH_3O)_3Si(CH_2)_3Cl$ at about 110° C. for about three hours. The reaction product was cooled to about 70° C. and treated with 130 pounds of ethylene diamine in an agitator for 30 minutes and 183 pounds of hydrochloride by-product (chloride content 31.7%) was removed from the reaction product. The reaction product was then stripped at 100° C./47 mm Hg. for two hours to remove 6 pounds of lites. Upon cooling and filtration 590 pounds of a crude aminosilicon reaction product mixture was obtained which consisted of a major amount of aminosilicon compounds having the following mole structural unit ratios:

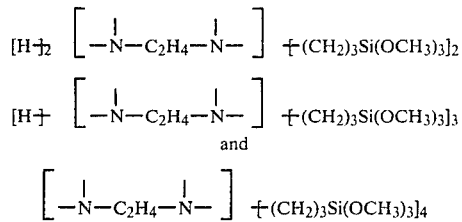

and a minor amount (about 15.1 percent by weight) of unreacted Silane A. As employed in this application the crude reaction product mixture of this Example is designated Silane H.

EXAMPLES 1-18

A series of hydroxyl containing organic polymeraminosilicon coating compositions were prepared having the following total formulation

| Compound | Parts by Weight |
| --- | --- |
| Polymer A | 25.45 |
| Titanium Dioxide | 19.09 |
| Methylisobutyl Ketone | 27.57 |
| Xylene | 27.57 |
| Nuosperse 657 | 0.32 |
| ES-40 | Varied* |
| Silane A | Varied* |

*Parts by weight given in TABLE II below.

Each coating composition was prepared by dissolving Polymer A in a solvent blend (50/50 wt. %) of methylisobutyl ketone and xylene followed by the addition of the dispersing agent and titanium dioxide pigment with stirring and the mixture ground in a pebble mill overnight. The aminosilane compound was then added with stirring as was the ethyl silicate when used until a uniform coating composition was obtained. Each coating composition was then thinned to a No. 4 Ford cup viscosity of 20-25 seconds by the addition of a 50/50 weight percent solvent blend of methylisobutyl ketone and xylene. Each coating composition was then sprayed onto aluminum panels to give a coating thickness of about 2 mils and the coatings on said panels cured by allowing them to air dry at room temperature.

The solvent resistance of each coating on said panels after having been air dried at room temperature for various periods of time was then measured by subjecting each air dried coating to double MEK rubs and the results of this test are reported in Table II below. Said test involves saturating a gauze cloth with methylethylketone and rubbing the saturated cloth back and forth (or up and down) over the air dried coating until the metal surface of the panel is exposed. For example, a numerical double MEK rub rating of five means that the metal surface of the panel was exposed after the methylethylketone saturated cloth was rubbed back and forth (2 strokes) over the coating a total of five times. Thus the higher the numerical double MEK rub rating obtained for a given coating the more solvent resistant the coating is.

The solvent resistance of each coating on said panels after having been air dried at room temperature for various periods of time was also measured by a solvent extraction test and the results of said tests are reported in Table II below. Said test involves measuring the difference in weight of the air dried coated panel before and after immersing the coated panel in boiling methylethylketone for 18 hours in order to obtain the weight percent of coating extracted from the test panel. Thus the lower the weight percent of coating that is extracted for a given coating, the more solvent resistant the coating is.

EXAMPLE 19

A hydroxyl containing organic polymer-aminosilicon coating composition having the following total formulation was prepared and thinned to a spray viscosity in the same manner as described in Examples 1-18.

| Compound | Parts by Weight |
|---|---|
| Polymer A | 25.45 |
| Titanium Dioxide | 19.09 |
| Methylisobutylketone | 27.57 |
| Xylene | 27.57 |
| Nuosperse 657 | 0.32 |
| ES-40 | 6.36 |
| Silane A | 6.4 |

The coating composition was then sprayed on to a series of zinc rich primed steel panels to give a top coating of about 2 mils and the top coatings on said panels cured by allowing them to air dry at room temperature for two weeks. The cured top coated steel panels were then tested for resistance against salt spray, synthetic seawater immersion and fresh water immersion and exhibited excellent results. The cured top coating of the panels tested exhibited no deterioration after (a) having been subjected to a salt spray for 1000 hours, (b) after having been immersed in synthetic seawater for 1000 hours, and (c) after having been immersed in fresh water for

TABLE II

SOLVENT EXTRACTION AND SOLVENT RESISTANCE

| EXAMPLE NO. | ES-40 (PARTS BY WT.) | SILANE A (PARTS BY WT.) | % WEIGHT EXTRACTED* | | | | | DOUBLE MEK RUBS | | | | | |
|---|---|---|---|---|---|---|---|---|---|---|---|---|---|
| | | | 1 DAY | 3 DAYS | 7 DAYS | 14 DAYS | 28 DAYS | 1 DAY | 3 DAYS | 7 DAYS | 14 DAYS | 28 DAYS | 120 DAYS |
| 1 | 0 | 0 | — | 100.00 | 100.00 | 99.83 | 96.58 | ½ | ½ | 4 | ½ | 1 | 3 |
| 2 | 8 | 8 | — | 31.85 | 28.73 | 26.19 | 21.68 | 3 | 8 | 13 | 15 | 18 | 52 |
| 3 | 8 | 6 | — | 33.18 | 31.34 | 28.27 | 25.44 | 3½ | 8 | 8 | 12 | 18 | 59 |
| 4 | 8 | 4 | — | 31.95 | 35.06 | 32.30 | 31.55 | 3½ | 7 | 8 | 11 | 17 | 38 |
| 5 | 8 | 2 | — | 43.41 | 41.37 | 39.84 | 40.27 | 3 | 7 | 8 | 9 | 12 | 20 |
| 6 | 6 | 6 | — | 31.71 | 29.97 | 27.68 | 26.04 | 4½ | 7 | 13 | 17 | 18 | 38 |
| 7 | 6 | 3.6 | — | 37.39 | 35.78 | 33.83 | 32.59 | 5 | 7 | 10 | 15 | 16 | 30 |
| 8 | 6 | 2 | — | 43.61 | 42.07 | 39.88 | 40.09 | 5 | 9 | 7 | 8 | 12 | 20 |
| 9 | 4 | 6 | — | 30.94 | 28.41 | 25.85 | 25.39 | 7 | 15 | 17 | 23 | 25 | 100+ |
| 10 | 4 | 4 | 40.71 | 40.05 | 39.05 | 37.60 | 36.66 | 4 | 7 | 8 | 9 | 12 | 20 |
| 11 | 4 | 2 | 47.22 | 47.35 | 45.41 | 46.57 | 43.79 | 5 | 7 | 6 | 7 | 8 | 12 |
| 12 | 4 | 1 | 66.50 | 59.77 | 50.81 | 53.60 | 51.24 | 4 | 5 | 6 | 6 | 5 | 8 |
| 13 | 2 | 6 | 37.15 | 33.46 | 30.09 | 27.77 | 24.49 | 7 | 8 | 15 | 19 | 17 | 100+ |
| 14 | 2 | 4 | 41.39 | 38.40 | 35.43 | 33.72 | 33.40 | 4 | 8 | 10 | 13 | 14 | 33 |
| 15 | 2 | 2 | 47.81 | 46.22 | 43.45 | 44.32 | 41.39 | 3 | 4 | 7 | 7 | 7 | 11 |
| 16 | 2 | 0.48 | 92.97 | 99.94 | 99.93 | 95.64 | 100.00 | 2 | 4 | 3 | 3 | 5 | 6 |
| 17 | 0 | 6 | 35.04 | 30.92 | 26.65 | 21.90 | 21.63 | 8 | 30 | 43 | 100 | 100+ | 100+ |
| 18 | 0 | 4 | 42.86 | 38.99 | 32.59 | 29.78 | 28.13 | 9 | 21 | 46 | 82 | 93 | 100+ |

*The average of triplicate sample runs.
+Double MEK rubs were stopped after reaching 100.

The above results of TABLE II demonstrate that the hydroxyl containing polymer-aminosilane compositions of this invention can be employed as room temperature crosslinkable coating compositions to provide very good solvent resistant coatings; that the solvent resistance of said coatings increases with time and levels off; that there is a direct correlation between the solvent extraction test and MEK rub test, as the MEK rub rating increases the percent extractable decreases; and that no ethyl silicate is necessary to obtain excellent solvent resistant coatings (Examples 17 and 18), while coatings obtained from formulations having little or no amino silane (Examples 1 and 16) have little if any solvent resistance.

1000 hours. Said top coated steel panels were also tested for adhesion of the top-coating to the primer by a crosshatch adhesion test with Scotch tape after having undergone the above three environmental tests. The only adhesion failure observed in each instance was cohesive failure of the primer to the steel.

EXAMPLES 20-23

A series of hydroxyl containing organic polymeraminosilicon coating compositions were prepared in the same manner as described in Examples 1-18 having the following total formulations.

| | Parts By Weight | | | |
|---|---|---|---|---|
| Compound | Example 20 | Example 21 | Example 22 | Example 23 |
| Polymer A | 25.45 | 25.45 | 25.45 | 25.45 |
| Titanium Dioxide | 19.09 | 19.09 | 19.09 | 19.09 |
| Methylisobutyl Ketone | 27.57 | 27.57 | 27.57 | 27.57 |
| Xylene | 27.57 | 27.57 | 27.57 | 27.57 |
| Nuosperse 657 | 0.32 | 0.32 | 0.32 | 0.32 |
| ES-40 | 8 | — | — | — |
| TEOS | — | 8 | — | — |
| Silane A | — | 8 | — | 4 |
| Silane B | 8 | — | — | — |
| Silane C | — | — | 8 | — |

Each coating composition was then applied to sand blasted steel panels by a draw down blade to give a coating thickness of about 1½ to 2 mils thick and the coatings on said panels cured by allowing them to air dry at room temperature. The solvent resistance of each coating on said panels after having been air dried at room temperature for various periods of time was then measured by subjecting each air dried coating to double acetone rubs and the results of this test are reported in Table III below. Said test is the same as the double MEK rub test given in Examples 1-18 save for the fact that acetone was used as the solvent instead of methylethylketone.

TABLE III

| Example No. | Double Acetone Rubs | | | | |
|---|---|---|---|---|---|
| | 1 Day | 3 Days | 1 Week | 2 Weeks | 1 Month |
| 20 | 8 | — | 100+ | — | — |
| 21 | 40 | — | 50 | 95 | — |
| 22 | 100+ | — | — | — | — |
| 23 | 3 | — | 26 | 35 | — |

+Double acetone rubs were stopped after reaching 100.

In addition the cured coating composition of Example 23 after having been cured by air drying at room temperature for 24 hours exhibited an impact strength of greater than 160 inch pounds, both direct and reverse, on a Dart Impact Tester, while the same coating without the aminosilane had an impact strength of less than about 20 inch pounds.

EXAMPLES 24-29

A series of hydroxyl containing organic polymeraminosilicon coating compositions were prepared in the same manner as described in Examples 1-18 having the following total formulation

| Compound | Parts By Weight |
|---|---|
| Polymer A | 25.0 |
| Titanium Dioxide | 19.0 |
| Methylisobutyl Ketone | 28.0 |
| Xylene | 28.0 |
| Silane* | 8.0 |

*The particular silane employed in each composition is given in TABLE IV below.

Each coating composition was then applied to sand blasted steel panels by a draw-down blade to give a coating of about 2 mils thick and the coatings on said panels cured by allowing them to air dry at room temperature. The solvent resistance of each coating after having been air dried at room temperature for various periods of time was then measured by the same double acetone rub test described in Examples 20-23 and the results of said test are given in Table IV below.

TABLE IV

| Example No. | Silane Used | Double Acetone Rubs | | | | |
|---|---|---|---|---|---|---|
| | | 1 Day | 5 Days | 2 Weeks | 6 Weeks | 2 Months |
| 24 | Silane C | 100+ | — | — | — | — |
| 25 | Silane A | 25 | 69 | 100+ | — | — |
| 26 | Silane D | 16 | 45 | 100+ | — | — |
| 27 | Silane E | 20 | 23 | 100+ | — | — |
| 28 | Silane B | 5 | 24 | 29 | 100+ | — |
| 29 | Silane F | 9 | 5 | 8 | — | 16 |

+Double acetone rubs were stopped after reaching 100.

EXAMPLE 30

A hydroxyl containing organic polymer-aminosilicon coating composition was prepared in the same manner as described in Examples 24-29 having the following total formulation.

| Compound | Parts by Weight |
|---|---|
| Polymer A | 25.0 |
| Titanium Dioxide | 19.0 |
| Methylisobutyl Ketone | 28.0 |
| Xylene | 28.0 |
| ES-40 | 12.0 |
| Silane A | 12.0 |

The composition so prepared was coated onto a sand blasted steel panel and tested for solvent resistance in the same manner as described in Examples 24-29. The results of the double acetone rub test are given in Table V below.

TABLE V

| Example No. | Double Acetone Rubs | |
|---|---|---|
| | 1 Day | 2 Weeks |
| 30 | 16 | 100+ |

+Double acetone rubs were stopped after reaching 100.

EXAMPLE 31

A hydroxyl containing organic polymer-aminosilicon coating composition having the following total formulation

| Compound | Parts by Weight |
|---|---|
| Polymer A | 24 |
| Titanium Dioxide | 18 |
| Methylisobutyl Ketone | 26 |
| Xylene | 26 |
| Nuosperse 657 | 0.3 |
| ES-40 | 6 |
| Silane A | 4.8 | was prepared and thinned to a spray viscosity in the same manner as described in Examples 1-18. The coating composition was then sprayed onto a sand blasted steel panel to give a coating thickness of about 1.5 mils and the coating cured by allowing it to air dry at room temperature for 24 hours. Said cured coating exhibited an impact strength of about 124 inch pounds, both direct and reverse, on a Dart Impact Tester, while a similar cured coating without the aminosilane compound failed below 28 inch pounds or both tests.

EXAMPLE 32

A hydroxyl containing organic polymer-aminosilicon coating composition having the following total formulation.

| Compound | Parts by Weight |
| --- | --- |
| Polymer A | 30.7 |
| Titanium Dioxide | 23.0 |
| Methylisobutyl Ketone | 23.0 |
| Xylene | 23.0 |
| Nuosperse 657 | 0.3 |
| Silane G | 6.14 | was prepared and thinned to a spray viscosity in the same manner as described in Examples 1–18. The coating composition was then sprayed on to a series of four different primed steel panels to give a top coating of about 2–3 mils over the various primed steel panels. The top coatings on said panels were then cured by allowing them to air dry at room temperature for two weeks. The cured topcoated steel panels were then tested for resistance against blistering and corrosion by subjecting two top coated panels from each primed panel category to (1) a 5% salt water spray test for 1000 hours, (2) to synthetic seawater immersion for 1000 hours and (3) to fresh water immersion for 1000 hours. No corrosion or blistering was observed for any of the top coated panels so tested.

EXAMPLES 33–35

A series of hydroxyl containing organic polymer-aminosilicon coating compositions were prepared in the same manner as described in Examples 1–18 having the following total formulation.

| Compound | Parts by Weight |
| --- | --- |
| Polymer B | 20 |
| Titanium Dioxide | 14 |
| Methylisobutyl Ketone | 32.85 |
| Xylene | 32.85 |
| Nuosperse 657 | 0.3 |
| Silane G | Varied |

*Parts by Weight given in Table VI below.

Each coating composition so prepared was then applied to a series of aluminum panels by a draw down blade to give a coating thickness of about 2 mils and the coatings on said panels cured by allowing them to air dry at room temperature. The solvent resistance of each cured coating on said panels after having been air dried at room temperature for various periods of time was measured by subjecting each air dried coating to the same double MEK rub test described in Examples 1–18 and the results of said test are given in Table VI below.

TABLE VI

| Example No. | Silane G (Parts by Wt.) | Double MEK Rubs | | | |
| --- | --- | --- | --- | --- | --- |
| | | 24 hrs. | 48 hrs. | 72 hrs. | 1 Week |
| 33 | 4 | 100+ | — | — | — |
| 34 | 3 | 30 | 40 | 59 | 90 |
| 35 | 2 | 8 | 45 | 50 | 60 |

+Double MEK rubs stopped after reaching 100.

EXAMPLES 36 and 37

A series of hydroxyl containing polymer-aminosilicon coating compositions were prepared in the same manner as described in Examples 1–18 (the molecular sieves being added with the titanium dioxide pigment) having the following total formulations

| | Parts by Weight | |
| --- | --- | --- |
| Compound | Example 36 | Example 37 |
| Polymer A | 25.45 | 25.45 |
| Titanium Dioxide | 19.09 | 19.09 |
| Methylisobutyl Ketone | 27.57 | 27.32 |
| Xylene | 27.57 | 27.32 |
| Molecular Sieves 4A | — | 0.5 |
| Nuosperse 657 | 0.3 | 0.3 |
| Silane H | Varied* | Varied* |

*Parts by weight given in TABLE VII below.

Each coating composition so prepared was then applied to a series of aluminum panels by a draw down blade to give a coating thickness of about 2 mils and the coatings on said panels cured by allowing them to air dry at room temperature. The solvent resistance of each cured coating on said panels were then measured by subjecting each cured coating to the same double MEK rub test described in Examples 1–18, both before and after said cured coatings had undergone various hydrolytic stability tests. The results of said double MEK rub tests are given in Table VII below.

TABLE VII

| | | DOUBLE MEK RUBS | | | |
| --- | --- | --- | --- | --- | --- |
| Ex. No. | Silane H (Parts by Wt.) | After 1 Week at Room Temp. | After Immersion* in Boiling Water for 24 Hours | After Immersion* in Fresh Water at 150° F. for 2 Months | After 2 Weeks at 150° F. and 100% Humidity |
| 36 | 1.28 | 7 | 4 | 9 | 14 |
| 36 | 2.55 | 100+ | 6 | 100+ | 100+ |
| 36 | 3.83 | 100+ | 100+ | 100+ | 100+ |
| 36 | 5.09 | 100+ | 100+ | 100+ | 100+ |
| 37 | 1.28 | 100+ | 6 | 9 | 11 |
| 37 | 2.55 | 100+ | 59 | 100+ | 100+ |
| 37 | 3.83 | 100+ | 100+ | 100+ | 100+ |
| 37 | 5.09 | 100+ | 100+ | 100+ | 100+ |

+Double MEK rubs stopped after reaching 100
*Blistering was observed

EXAMPLES 38 to 41

A series of hydroxyl containing organic polymer-aminosilicon coating compositions were prepared having the following total formulations.

| | Parts by Weight | | | |
| --- | --- | --- | --- | --- |
| Compound | Example 38 | Example 39 | Example 40 | Example 41 |
| Polymer C | — | 17.5 | — | — |
| Polymer D | 38.5 | — | — | — |
| Polymer E | — | — | 66 | — |
| Polymer F | — | — | — | 9.1 |
| Titanium Dioxide | 23 | 12.5 | 8 | 6.3 |
| Xylene | — | — | 23 | — |
| Methyl Ethyl Ketone | 38.5 | — | — | — |
| Cellosolve Acetate | — | 57 | — | — |
| Toluene | — | 13 | — | — |
| Butyl Alcohol | — | — | 3 | 17.7 |
| Isopropyl Alcohol | — | — | — | 66.9 |
| ES-40 | 6 | — | 8 | — |
| Silane C | 6 | 2 | 8 | 4 |

Each polyol was dissolved in the solvent or solvent blend employed and titanium dioxide added while mixing with a high speed disperser until a Hegman fineness of grind of 6 to 8 was obtained. The ethyl silicate if used was then added followed by the aminosilane with stirring until a uniform coating composition was obtained. Each coating composition was then applied to sand blasted steel panels with a draw down blade to give a coating thickness of about 2 mils. The coatings on said panels were then cured by allowing them to air dry at room temperature and the solvent resistance of each cured coating after having been air dried at room temperature for various periods of time measured by the same double acetone rub test described in Examples 20 to 23. The results of said test are reported in the following table.

TABLE VIII

| Example No. | Double Acetone Rubs | | | | |
|---|---|---|---|---|---|
| | 24 Hours | 4 Days | 1 Week | 2 Weeks | 1 Month |
| 38 | — | 12 | 14 | 14 | 15 |
| 39 | 26 | 62 | 76 | — | 100+ |
| 40 | 33 | 24 | 34 | 36 | 24 |
| 41 | 86 | 70 | 73 | — | 100+ |

+Double acetone rubs stopped after reaching 100.

EXAMPLES 42 to 49

A series of hydroxyl containing organic polymer-aminosilicon coating compositions were prepared having the following total formulations

| Compound | Parts By Weight | | | | | | | |
|---|---|---|---|---|---|---|---|---|
| | Ex.42 | Ex.43 | Ex.44 | Ex.45 | Ex.46 | Ex.47 | Ex.48 | Ex.49 |
| Polymer A | 25.45 | 25.45 | 25.45 | 25.45 | 25.45 | 25.45 | 25.45 | 25.45 |
| Titanium Dioxide | 19.09 | 19.09 | 19.09 | 19.09 | 19.09 | 19.09 | 19.09 | 19.09 |
| Methylisobutyl Ketone | 27.57 | 27.57 | 27.57 | 27.57 | 27.57 | 27.57 | 27.57 | 27.57 |
| Xylene | 27.57 | 27.57 | 27.57 | 27.57 | 27.57 | 27.57 | 27.57 | 27.57 |
| Nuosperse 657 | 0.32 | 0.32 | 0.32 | 0.32 | 0.32 | 0.32 | 0.32 | 0.32 |
| Molecular Sieves 4A | — | — | 0.5 | 0.5 | 2.55 | 2.55 | 2.55 | 2.55 |
| Methanol | — | 2 | — | 2 | — | 2 | — | 2 |
| Distilled Water | 1.2 | 1.2 | 1.2 | 1.2 | 1.2 | 1.2 | 1.2 | 1.2 |
| Silane H | 5.08 | 5.08 | 5.08 | 5.08 | 5.0 | 5.0 | 5.0 | 5.0 |

Each composition was prepared by dissolving the solvent in the solvent blend followed by addition of the titanium dioxide, molecular sieves and Nuosperse 657 while mixing in a high speed disperer until a finely ground mixture was obtained. The water, methanol and silane, in that order, were then stirred into the composition until a uniform coating composition was obtained. Each coating composition was then applied to sand blasted steel panels with a draw down blade to give a coating thickness of about 2 mils. The coatings on said panels were then cured by allowing them to air dry at room temperature and the solvent resistance of each cured coating after having been air dried at various periods of time measured by the same double MEK rub test described in Examples 1–18. The results of said test are given in the following table.

TABLE IX

| Example No. | Double MEK Rubs | |
|---|---|---|
| | 24 Hours | 8 Days |
| 42 | 15 | 85 |
| 43 | 22 | 100+ |
| 44 | 12 | 100+ |
| 45 | 52 | 100+ |
| 46 | 11 | 30 |
| 47 | 25 | 100+ |

TABLE IX-continued

| Example No. | Double MEK Rubs | |
|---|---|---|
| | 24 Hours | 8 Days |
| 48 | 50 | 100+ |
| 49 | 55 | 100+ |

+Double MEK rubs stopped after reaching 100.

EXAMPLES 50 and 51

A series of hydroxyl containing polymer-aminosilicon coating compositions were prepared in the same manner as described in Examples 36 and 37 having the following total formulations.

| Compound | Parts by Weight | |
|---|---|---|
| | Example 50 | Example 51 |
| Polyol A | 25.45 | 25.45 |
| Titanium Dioxide | 19.09 | 19.09 |
| Methylisobutyl Ketone | 27.57 | 27.32 |
| Xylene | 27.57 | 27.32 |
| Nuosperse 657 | 0.3 | 0.3 |
| Molecular Sieves 4A | — | 0.5 |
| Silane A | 1.28 | 1.28 |

Each coating composition so prepared was then applied to aluminum panels by a draw down blade to give a coating of about 2 mils and the coatings on said panels cured by allowing them to air dry at room temperature.

The solvent resistance of each cured coating on said panels was then measured after having been air dried at various periods of time by the same double MEK rub test described in Examples 1-18. The results of said test are given in the following table.

TABLE X

| Example No. | Double MEK Rubs | | | | |
|---|---|---|---|---|---|
| | 1 Week | 2 Weeks | 3 Weeks | 1 Month | 2 Months |
| 50 | 10 | 23 | 47 | 90 | 100+ |
| 51 | 38 | 73 | 100+ | 100+ | 100+ |

+Double MEK rubs stopped after reaching 100.

Various modifications and variations of this invention will be obvious to a worker skilled in the art and it is to be understood that such modifications and variations are to be included within the purview of this application and the spirit and scope of the appended claims.

What is claimed is:

1. A substantially anhydrous, acid-free, room temperature curable composition which comprises (A) an organic thermoplastic polymer containing at least two hydroxyl radicals which are directly bonded to non-carboxylic carbon atoms of said polymer; and (B) a hydrolyzable aminosilicon compound selected from the class consisting of aminosilicon compounds having the average formula $$X_{3-a}-\underset{\underset{R_a^1}{|}}{Si}-R(NR^3)_t\underset{\underset{R^2}{|}}{N}-R^2$$

and mixtures thereof wherein:
X is an alkoxy radical having 1 to 6 carbon atoms; R is a divalent alkylene radical having 1 to 4 carbon atoms; $R^1$ is hydrogen or an alkyl radical having 1 to 4 carbon atoms, $R^2$ is a radical selected from the group consisting of hydrogen, an alkyl radical having 1 to 4 carbon atoms and a silyl radical of the formula $$-R-\underset{\underset{R_a^1}{|}}{Si}-X_{3-a};$$

wherein R, $R^1$, and X are the same as defined above; and wherein $R^3$ is a divalent alkylene radical having 2 to 4 carbon atoms; a has a value of 0 to 2 and t has a value of 0 to 4; and wherein said composition contains about 5 to 50 parts by weight of said hydrolyzable aminosilicon compound (B) per 100 parts by weight of said organic polymer (A).

2. A composition as defined in claim 1 wherein X is an alkoxy radical selected from the group consisting of methoxy, ethoxy and 2-methoxyethoxy, wherein R and $R^3$ are divalent alkylene radicals selected from the group consisting of ethylene and propylene, and wherein a is 0.

3. A composition as defined in claim 2 wherein t is 0.
4. A composition as defined in claim 2 wherein t is 1.
5. A composition as defined in claim 4, wherein R is a propylene radical and $R^3$ is an ethylene radical.
6. A composition as defined in claim 5 wherein each $R^2$ is individually selected from the group consisting of hydrogen, and a silyl radical of the formula $$-(CH_2)_3Si-X_3$$

7. A composition as defined in claim 6 wherein X is a methoxy radical.
8. A composition as defined in claim 7 wherein the aminosilicon compound is a mixture of said aminosilicon compounds.
9. A composition as defined in claim 3, wherein X is an ethoxy radical, R is a propylene radical and each $R^2$ is individually selected from the group consisting of hydrogen and a silyl radical of the formula $$-(CH_2)_3Si(OC_2H_5)_3$$

10. A composition as defined in claim 1 wherein the organic thermoplastic polymer is selected from the class consisting of a hydroxylalkyl acrylate modified vinyl chloride polymer, a polyether polyol polymer, a polyhydroxy containing acrylate polymer, a polyvinyl alcohol polymer, a polyhydroxy containing polyvinyl acetal polymer, a polyester polyol polymer, a phenolic resin polymer, and mixtures thereof.

11. A composition as defined in claim 10, wherein X is an alkoxy radical selected from the group consisting of methoxy, ethoxy, and 2-methoxyethoxy, wherein R and $R^3$ are divalent alkylene radicals selected from the group consisting of ethylene and propylene, wherein a is 0, t is 1 and wherein each $R^2$ is individually selected from the group consisting of hydrogen and a silyl radical of the formula $$-RSiX_3$$

12. A composition as defined in claim 11, wherein the organic thermoplastic polymer is a hydroxyalkyl acrylate modified vinyl chloride polymer.
13. A composition as defined in claim 11, wherein the organic thermoplastic polymer is a polyether polyol polymer.
14. A composition as defined in claim 11, wherein the organic thermoplastic polymer is a polyhydroxy containing polyvinyl acetal polymer.
15. A composition as defined in claim 11 wherein the organic thermoplastic polymer is a polyhydroxy containing acrylate polymer.
16. A composition as defined in claim 11, wherein the organic thermoplastic polymer is a polyvinyl alcohol polymer.
17. A composition as defined in claim 11, wherein the organic thermoplastic polymer is a polyester polyol polymer.
18. A composition as defined in claim 11, wherein the organic thermoplastic polymer is a phenolic resin polymer.
19. A composition as defined in claim 11, wherein R is a propylene radical, $R^3$ is an ethylene radical, X is methoxy and wherein the aminosilicon compound is a mixture of said aminosilicon compounds.
20. A composition as defined in claim 1, wherein said composition contains about 10 to about 40 parts by weight of said hydrolyzable aminosilicon compound (B) per 100 parts by weight of said organic polymer (A).
21. A composition as defined in claim 1 wherein an alkylsilicate is present as an additional ingredient.
22. A composition as defined in claim 21, wherein the alkyl silicate is tetraethyl orthosilicate.
23. A composition as defined in claim 10 which also contains an organic solvent in an amount sufficient to dissolve the organic polymer employed; about 70 to 100 parts by weight of a pigment per 100 parts by weight of said organic polymer; 0 to about 70 parts by weight of a filler material per 100 parts by weight of said organic polymer; 0 to about 25 parts by weight of an alkyl silicate; and based on the total weight of the composition 0 to about 1 percent by weight of a dispersing agent for said pigment and 0 to about 3 percent by weight of a dessicant material.
24. A composition as defined in claim 23, wherein X is an alkoxy radical selected from the group consisting of methoxy, ethoxy and 2-methoxyethoxy, wherein R and $R^3$ are divalent alkylene radicals selected from the group consisting of ethylene and propylene, wherein a is 0, t is 1 and wherein each $R^2$ is individually selected from the group consisting of hydrogen and a silyl radical of the formula $$-RSiX_3.$$

25. A composition as defined in claim 24, wherein the organic thermoplastic polymer is a hydroxyalkyl acrylate modified vinyl chloride polymer.
26. A composition as defined in claim 24, wherein the organic thermoplastic polymer is a polyether polyol polymer.

27. A composition as defined in claim 26, wherein the polyether polyol polymer is a phenoxy resin.

28. A composition as defined in claim 24, wherein the organic thermoplastic polymer is a polyhydroxy containing polyvinyl acetal polymer.

29. A composition as defined in claim 28 wherein the polyhydroxy containing polyvinyl acetal polymer is a polyvinylbutyral resin.

30. A composition as defined in claim 24, wherein the organic thermoplastic polymer is a polyhydroxy containing acrylate polymer.

31. A composition as defined in claim 24, wherein the organic thermoplastic polymer is a polyvinyl alcohol polymer.

32. A composition as defined in claim 24, wherein the organic thermoplastic polymer is a polyester polyol polymer.

33. A composition as defined in claim 24, wherein the organic thermoplastic polymer is a phenolic resin polymer.

34. A composition as defined in claim 25, wherein R is a propylene radical, $R^3$ is an ethylene radical, X is methoxy and wherein the aminosilicon compound is a mixture of said aminosilicon compounds.

35. A composition as defined in claim 23, wherein said composition contains about 10 to about 40 parts by weight of said hydrolyzable aminosilicon compound (B) per 100 parts by weight of said organic polymer (A).

36. A composition as defined in claim 23, wherein the pigment is titanium dioxide.

37. A composition as defined in claim 25, wherein the organic polymer contains (a) from about 50 to about 85 weight percent of vinyl chloride derived mer units, (b) from about 0 to 10 weight percent mer units derived from a polymerizable monomer selected from the class consisting of alkyl esters of alpha, beta-ethylenically unsaturated carboxylic acids and vinyl esters of saturated fatty acids, and (c) from 10 to 30 percent mer units derived from hydroxyalkyl acrylate.

38. A composition as defined in claim 37, wherein the organic polymer is a hydroxy-functional random terpolymer containing about 80 weight percent vinyl chloride mer units, about 5 weight percent vinyl acetate mer units and about 15 weight percent hydroxypropyl acrylate mer units.

39. A composition as defined in claim 38, wherein said composition contains about 10 to about 40 parts by weight of said hydrolyzable aminosilicon compound (B) per 100 parts by weight of said organic polymer (A).

40. A composition as defined in claim 39, wherein the pigment is titanium dioxide.

41. The crosslinked polymer product obtained upon crosslinking the composition of claim 1.

* * * * *